(12) United States Patent
Liebau

(10) Patent No.: US 6,601,193 B1
(45) Date of Patent: Jul. 29, 2003

(54) DYNAMIC EVENT RECOGNITION

(75) Inventor: Henrik Liebau, Stuttgart (DE)

(73) Assignee: Agilent Technologies, Inc., Palo Alto, CA (US)

( * ) Notice: Subject to any disclaimer, the term of this patent is extended or adjusted under 35 U.S.C. 154(b) by 497 days.

(21) Appl. No.: 09/631,983

(22) Filed: Aug. 3, 2000

(30) Foreign Application Priority Data

Aug. 6, 1999 (EP) .............................................. 99115565

(51) Int. Cl.⁷ ................................................ G06F 11/30
(52) U.S. Cl. ......................................... 714/39; 709/318
(58) Field of Search ............................ 714/39, 45, 43, 714/56, 819; 710/109; 709/318

(56) References Cited

U.S. PATENT DOCUMENTS

| | | | | |
|---|---|---|---|---|
| 4,720,778 A | * | 1/1988 | Hall et al. .................... | 714/38 |
| 5,867,644 A | * | 2/1999 | Ranson et al. ................ | 714/39 |
| 5,956,476 A | * | 9/1999 | Ranson et al. ................ | 714/30 |
| 6,105,087 A | * | 8/2000 | Rivoir ......................... | 710/100 |
| 6,374,370 B1 | * | 4/2002 | Bockhaus et al. ............ | 714/39 |

FOREIGN PATENT DOCUMENTS

EP          0 573 651 A     12/1993

OTHER PUBLICATIONS

"VLSI Based Tools for Monitoring Bus Communication Channels." F. Gregoretti and F. Maddaleno. Dipartimento di Elettronica, Politecnico di Torino. Corso Duca degil Abruzzi 24, I–10129, Torino, Italy.

"Bus Analyzer: einer statt fünf." Thomas Nygaard and Stephan Troesh. *Elektronik*. Oct. 13, 1992, No. 21, Munchen, DE.

* cited by examiner

*Primary Examiner*—Scott Baderman

(57) ABSTRACT

Disclosed is an event recognition unit (400) for recognizing and/or monitoring events on an information bus (120). The event recognition unit (400) comprises a sequencer state machine (140) for determining sequential dependencies of events, and a comparator (110) coupled to the information bus (120) and to the sequencer state machine (140). The comparator (110) provides a signal to the sequencer state machine (140) when a pattern on the information bus (120) matches with a pattern term of the comparator (110). The event recognition unit (400) further comprises an output loop (410, 420) from the sequencer state machine (140) to the comparator (110) for dynamically setting the pattern term of the comparator (110).

9 Claims, 4 Drawing Sheets

DYNAMIC EVENT RECOGNITION

BACKGROUND OF THE INVENTION

The present invention generally relates to an event recognition unit for recognizing and/or monitoring events on an information bus.

There are several possibilities known in the art to recognize events in a data processing unit such as a personal computer (PC), a workstation, or the like. The term 'event', as used herein, shall refer to any kind of occurrence of significance, e.g. a dead lock situation ('transfer does never complete'), a dead system ('no bus traffic after x clocks'), an access to an address A by an agent B, or the like.

Events occurring in the data processing unit are normally recognized (and might further be captured) by monitoring data communication facilities such as data busses, whereby the term 'data bus' shall refer to any kind of data connection as known in the art.

FIG. 1 depicts an event counter 5 for real-time counting as a device for event recognition as known in the art. A comparator 10 receives at least one input signal to be observed on an input bus 20. The comparator 10 monitors the input bus 20 for a predefined-pattern (also referred to as pattern terms) and provides a count signal on a line 30 to a counter 40, e.g. a logical '1' in case of an observed event (i.e. the predefined pattern has been detected). Generally speaking, a pattern (term) is a logical term which can result in either a logical '0' or a logical '1'. It can comprise any logical relationship between bus patterns and pre-programmed terms. These relationships can be mask/value combinations (like "AD32==000b8xxx\h"), ranges (like "signal <=7 && signal >1"), lists (like "cmd==7|cmd==3|cmd==9"), or the like. It can be generally stated that a pattern term's value consists of a variable part and of a fixed part.

A pattern on input bus 20 is detected when for each of the signals, that input bus 20 consists of, one of the following conditions is met: the input signal is in the logical '0' state or in the logical '1' state or is in any logical state (don't care), dependent on its specification. The number of events in the input signal on the input bus 20 is thus counted by the counter 40.

The term 'counters' as used herein shall apply to devices, such as registers or storage locations, which are used to represent a number of occurrences of an event. Counters are normally used in conjunction with a filter or trigger module for real time counting of a specific event.

The comparator 10, or another filter or trigger module, ergo selects, according to the predefined pattern, whether or not the occurred event will be counted by the counter 40. A more illustrative example to understand the function of the conventional event counter 5 could be a task to measure all red cars traveling from a point A to a point B. The comparator 10 (as filter or trigger task) would select the red cars on the input bus 20 only and send this information via line 30 to the counter 40 which counts the number of red cars as the filtered or triggered events.

Event counters 5 are often applied for performance measurement purposes. The performance represents the degree to which a system or component accomplishes its designated function within given constraints, such as speed accuracy or memory usage. The performance can be defined e.g. by the ratio of the number of specific events to all events, or by the number of events per time unit.

For performance measurements (e.g. 'the percentage of red cars'), the input bus 20 might further be coupled to an input information counter 50 counting all events in the input signal on the input bus 20, whereas the event counter 5 will only count specific events defined by the specific pattern. The counter 40 of the event counter 5 and the input information counter 50 are coupled to a processing unit 60 which determines the performance on the input bus 20, e.g., by dividing the content of counter 40 by the content of the input information counter 50. The input information counter 50 can basically be built up in accordance with the event counter 5.

The information as received from the performance measurement according to FIG. 1 provides only a limited information about the actual performance on input bus 20 which might not be sufficient for certain applications.

Another known device for event evaluation is a so-called trace memory 70. The trace memory 70 comprises an event recognizer 80 which is coupled via a line 85 to a memory 90 for controlling a read/write access of the memory 90 on the input bus 20. The memory 90 stores events recognized by the event recognizer 80. The trace memory 70 thus allows to reproducible 'trace' events e.g. for logic analyzing. The event recognizer 80 normally allows—dependent on a recognized event—to either move to a successive state, to jump to a predefined state, or to stay in the current state. This, however, might not be sufficient for applications that are more complex.

For the purpose of initiating bus transactions (i.e. a write access to a system memory via a PCI bus), a system Hewlett-Packard HP E2910A, introduced by the applicant, uses a plurality of comparators in combination with a sequencer state machine as an event recognition unit 100, as depicted in FIG. 2. The event recognition unit 100 comprises one or more comparators 110a . . . 110z coupled to an information bus 120. An output of each one of the comparators 110a . . . 110z is coupled via a line 130a . . . 130z to a sequencer state machine 140. The sequencer state machine 140 comprises a memory 142 and a register 144, whereby one or more outputs of the register 144 are coupled back to one or more inputs of the memory 142 as indicated by line 146. The coupling back allows the sequencer state machine 140 to move between different states, whereby the specific state of the sequencer state machine 140 is not constant but depends on the history of information as provided thereto. The sequencer state machine 140 further receives a clock signal CLOCK on a line 150, and eventually provides an output bus 160 for initiating the bus transactions.

In the HP E2910A, the comparators 110a . . . 110z monitor the information bus 120 for predefined event-patterns (in accordance with comparator 10 in FIG. 1) and thus signal occurring events to the sequencer state machine 140. The sequencer state machine 140 moves from one state to a next state according to the information as provided on its inputs 130a . . . 130z, 146, and 150. When the sequencer state machine 140 reaches a certain predefined state, it will initiate a corresponding bus transaction by means of respective output signals applied to the output bus 160.

A system Hewlett-Packard HP E2925A, again introduced by the applicant, uses the concept of the event recognition unit 100 for analyzing data streams on the information busses 120a . . . 120z e.g. for applied protocols or information data, thus allowing monitoring and analyzing time information and correlations between events.

FIG. 3 shows a data-analyzing unit 200 of the Hewlett-Packard HP E2925A. The data-analyzing unit 200 comprises an event recognition unit 205 as an enhancement of the event recognition unit 100. The one or more comparators 110a ... 110z are coupled to one or more information busses 120a ... 120z, respectively. The information busses 120a ... 120z can represent one single information line, a plurality of individual information busses, or combinations thereof, and may also be coupled to one information bus 120. A sequencer state machine 140A according to the invention, which basically corresponds to the sequencer state machine 140, may further receive a clock signal CLOCK on a line 150, and provides one or more output busses 160a ... 160z. The sequencer state machine 140A will move from one state to a next state according to the information as provided on its inputs, e.g., on the lines 130a ... 130z, on the line 150, and/or output 220a. This move between different states is indicated by a state loop 180, which illustrates that the specific state of the sequencer state machine 140A is not constant but depends on the history of information as provided thereto.

Sequencer states, outputs, and transition conditions of the data-analyzing unit 200 have to be programmed in a 'programming mode', and the data-analyzing unit 200 is then started and put in 'run mode' to operate.

Modern self-configuring information bus systems work with data patterns which might not already be called until runtime of the system when they are configured. In order to capture relevant data, it becomes necessary to do a test run, take note of the values of the respective configuration data, and re-program the data-analyzing unit 200 with these values. This only works when that data does not change on subsequent runs. When configuration data changes dynamically, capturing is not possible at all.

SUMMARY OF THE INVENTION

It is therefore an object of the present invention to provide an improved tool for monitoring and/or processing events occurring in a data processing unit, in particular when configuration data or event patterns change dynamically.

The object is solved by the independent claims. Preferred embodiments are shown by the dependent claims.

According to the invention, an event recognition unit is provided with an output loop for dynamically setting (programming or reprogramming) comparators of the event recognition unit. Thus, the event recognition unit according to the invention can dynamically react to event patterns on the bus that are not known at programming time.

An event recognition unit according to the invention comprises one or more comparators coupled to an information bus. Outputs of the one or more comparators provide inputs of a sequencer state machine. One or more outputs of the sequencer state machine are coupled back to one or more of the comparators thus allowing to dynamically program or reprogram the comparators, e.g. in accordance with monitored events at runtime.

The programming output loop from the sequencer state machine can change the pattern terms of the comparators either directly by directly setting new (fixed and/or variable) values of the pattern terms, or indirectly by causing the comparators to receive new pattern terms e.g. from the information bus. Using the programming output loop allows that in reaction to certain events on the information bus a program output can be activated causing a corresponding pattern term to be modified as a dynamic pattern term.

In one embodiment, programming or reconfiguring is accomplished in that on an active programming output, the respective comparator loads new (fixed and/or variable) value settings. The can be determined e.g. by the state of the information bus (example: load current state of AD32-line) or by other inputs. All of these input values can be masked, i.e. only relevant parts will be programmed. Programming new variable settings provides means to react to events of which the value ranges are not known at programming time, e.g. the size of an address range. Both fixed and variable values themselves can be masked by a "programming mask".

In a preferred embodiment, dynamic pattern terms can have a "valid-bit" determining whether the pattern has been programmed yet. If the valid-bit is set to "invalid", the pattern term of the comparator will never match until it is configured. Programming of the pattern term will set the valid-bit to "valid".

The invention augments possible recognizing events by dynamically reacting to previous events. The "state history" of the sequencer can be complimented by an "event history" represented in the dynamic pattern terms. Information on the bus cannot only be captured at specific points in time (as e.g. in a trace memory) but may also be used for triggering further events occurring at later points in time.

The invention is preferably directly implemented in hardware, since software solutions analyzing capture data and reprogramming the pattern terms will not achieve the short reaction times needed in fast systems. In hardware implementations, the reaction time can be provided in the order of clocked cycles. For devices not having a microprocessor or microcontroller, software implementations are impossible.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 2:
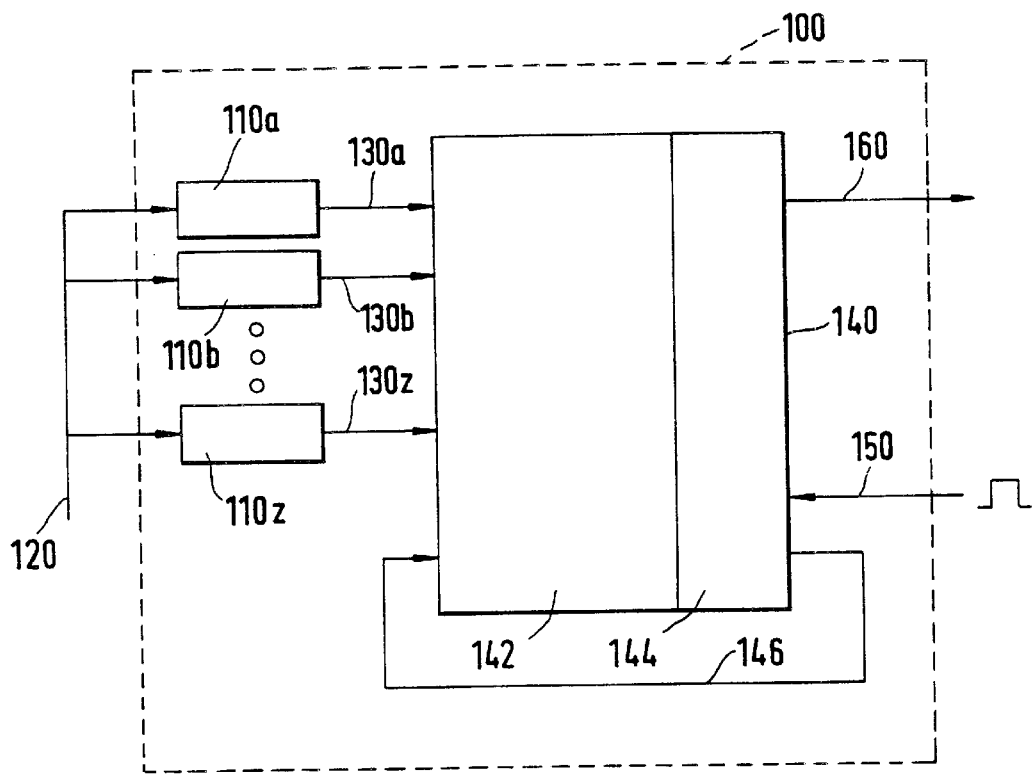
FIG. 2 shows a plurality of comparators in combination with a sequencer state machine as an event recognition unit for the purpose of initiating bus transactions.
Figure 3:
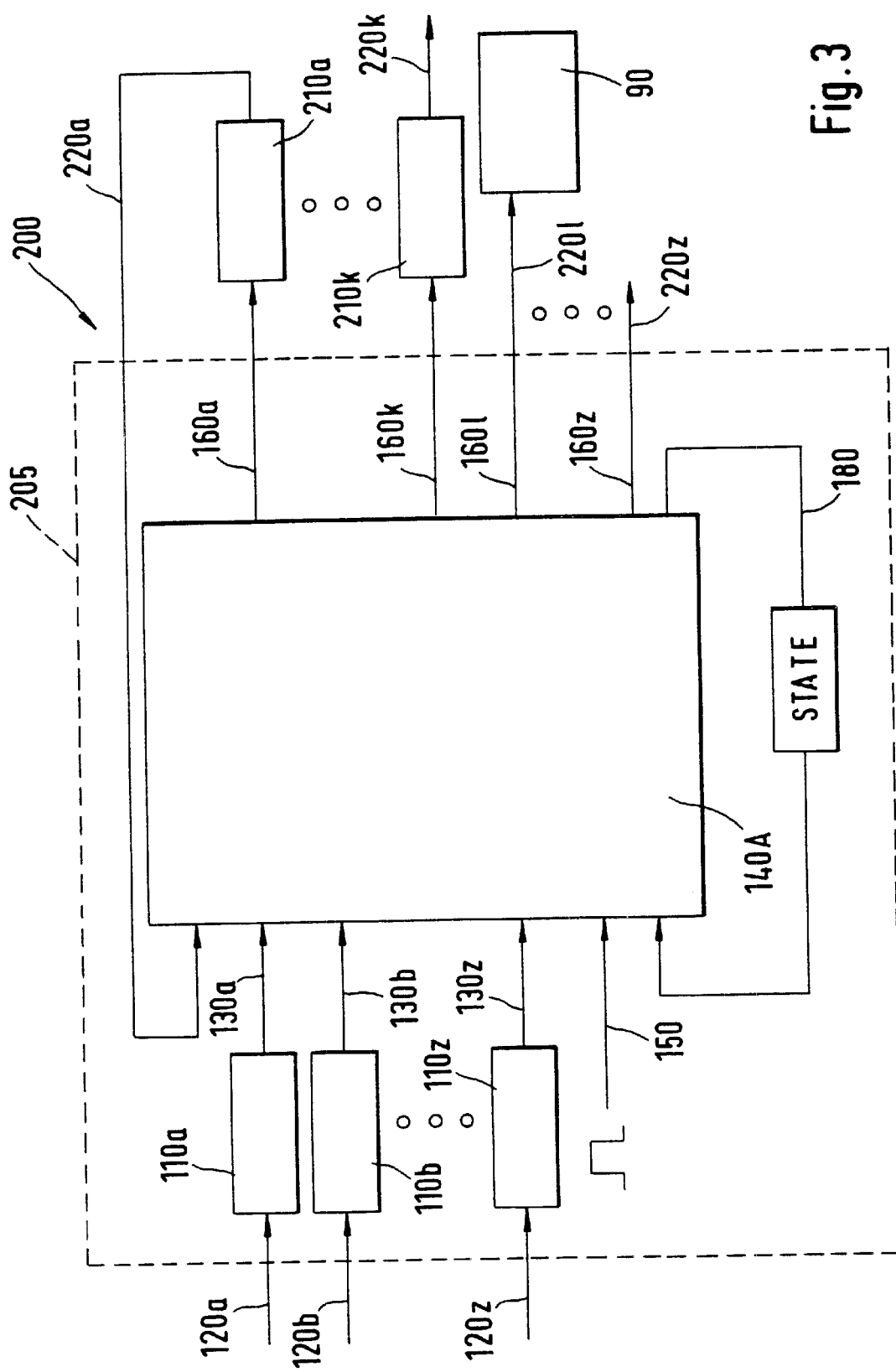
FIG. 3 shows a data-analyzing unit as known in the art.
Figure 4:
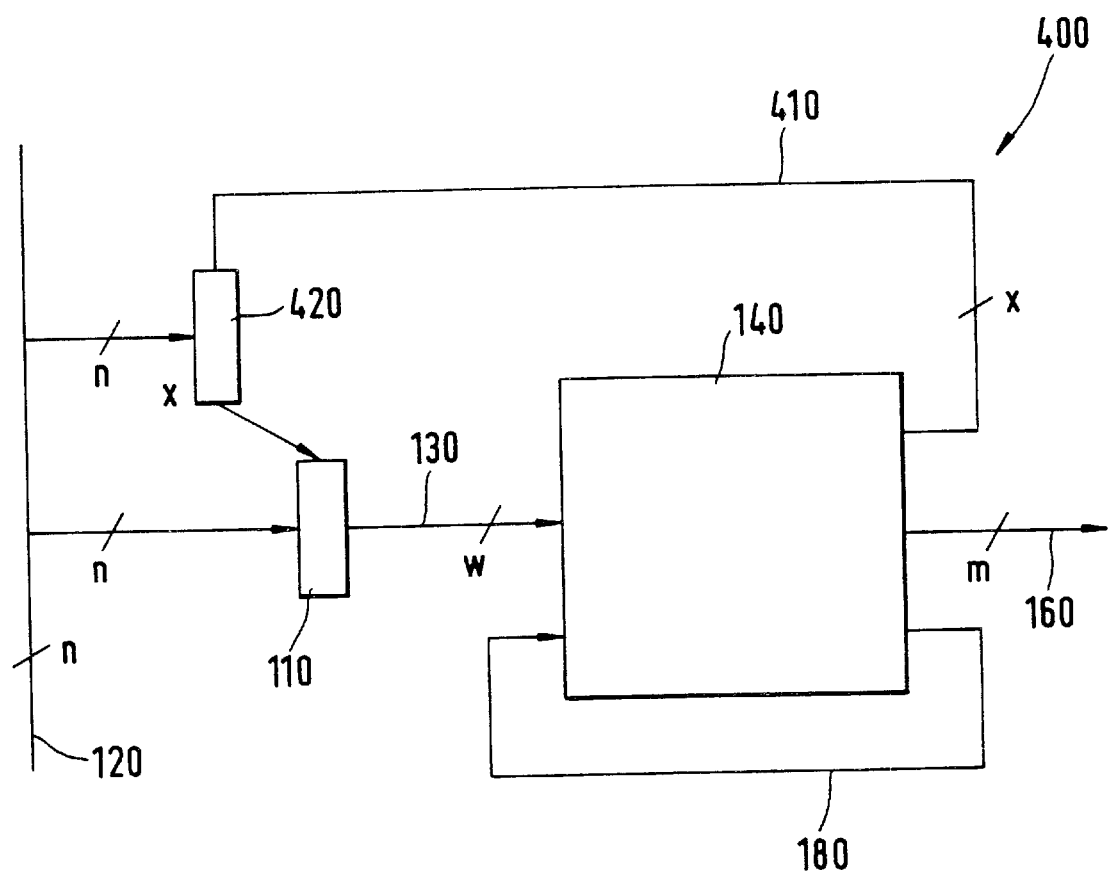
FIG. 4 shows an embodiment of an event recognition unit 400 according to the invention.

FIG. 4 shows an embodiment of an event recognition unit 400 according to the invention. A plurality of w (with w=1, 2, 3, ...) comparators 110 is coupled to the information bus 120, each receiving n (with n=1, 2, 3, ...) signals from the information bus 120. The w comparators 110 provide w input lines to the sequencer state machine 140. The sequencer state machine 140 provides m (with m=1, 2, 3, ...) output buses 160 and the state loop 180. Insofar, the event recognition unit 400 can be build up well in accordance with FIGS. 2 or 3.

The event recognition unit 400 in accordance with the present invention further comprises a program output 410 coupling with x (with x=1, 2, 3, ... and x<=w) lines from the output of the sequencer state machine in 140 to x registers 420. Each register 420 is coupled with n lines to information bus 120. The x registers 420 are further coupled to the w comparators 110.

For programming or reprogramming one or more of the comparators 110, the sequencer state machine 140 emits respective signals via the program output 410 to the corresponding register 420. In a direct programming mode, the registers 420 directly pass their contents dependent on the program output 410 to the respective comparators 110. In an indirect programming mode, each register 420 waits until a defined pattern occurs on the information 120 and then passes that pattern to the respective comparator 110. Alternatively, the register 420 might also cause the comparator 110 to directly receive a predefined information as pattern terms from the information bus 120.

In a preferred embodiment, the dynamic pattern terms to be programmed via the program output are provided with a "valid-bit" stating whether the pattern has been programmed yet or not. If the valid-bit is set to "invalid", the pattern term will not match until it is configured. Programming the pattern term will set the valid-bit to "valid".

The sequencer state machine 140 can be embodied by any state machine as known in the art and will move from one state to a next state according to the information as provided on its inputs, e.g., on the lines 130, on a clock input and/or a fed back output (cf. line 220a in FIG. 3). This move between different states is indicated by the state loop 180, which illustrates that the specific state of the sequencer state machine 140 is not constant but depends on the history of information as provided thereto.

In a preferred embodiment (cf. FIG. 2), the sequencer state machine 140 comprises the memory 142 and the register 144, whereby the state loop 180 is embodied by one or more outputs of the register 144 coupled back to one or more inputs of the memory 142. The register 144 may be coupled to one or more outputs of the memory 142 and is preferably controlled by the clock signal CLOCK. The memory 142 is preferably implemented as a random-access memory RAM that can be loaded by software tools. This allows to reprogram the sequencer state machine 140 at programming time (e.g. by the end-user), meaning that event needs or rules need not be determined at design time, but can be defined at programming time by software tools.

For analyzing data on the information bus 120, the sequencer state machine 140 can be coupled via one or more of its outputs 160 to one or more counters 210a ... 210k (cf. FIG. 3) providing one or more outputs 220a ... 220k, respectively. Other ones of the outputs 160 might be coupled to other functional devices (such as a memory, thus establishing a trace memory) or be coupled back to one or more inputs of the sequencer state machine 140.

The comparators 110 can be embodied by any kind of comparator means as known in the art which act as trigger or filter modules. At least the comparators 110 controlled by the registers 420 are programmable comparators. Each comparator 110 individually compares the information as received from the information bus 120 with a predefined information pattern and provides a signal on a respective one of the lines 130, when the provided information matches the predefined information pattern. Depending on the information provided to the inputs of the sequencer state machine 140, e.g. the results of the comparators 110, a clock signal (not shown in FIG. 4), the state loop 180, or coupled back output lines 160, the sequencer state machine 140 will either move to a different state or stay in the same state. The sequencer state machine 140 can thus trigger one or more of the counters 210a ... 210k (cf. FIG. 3), trigger the memory 90 to store a specific information, or provide a specific output signal. Sequential dependencies of the information provided by the information busses 120 can thus be determined and/or traced.

Figure 1:
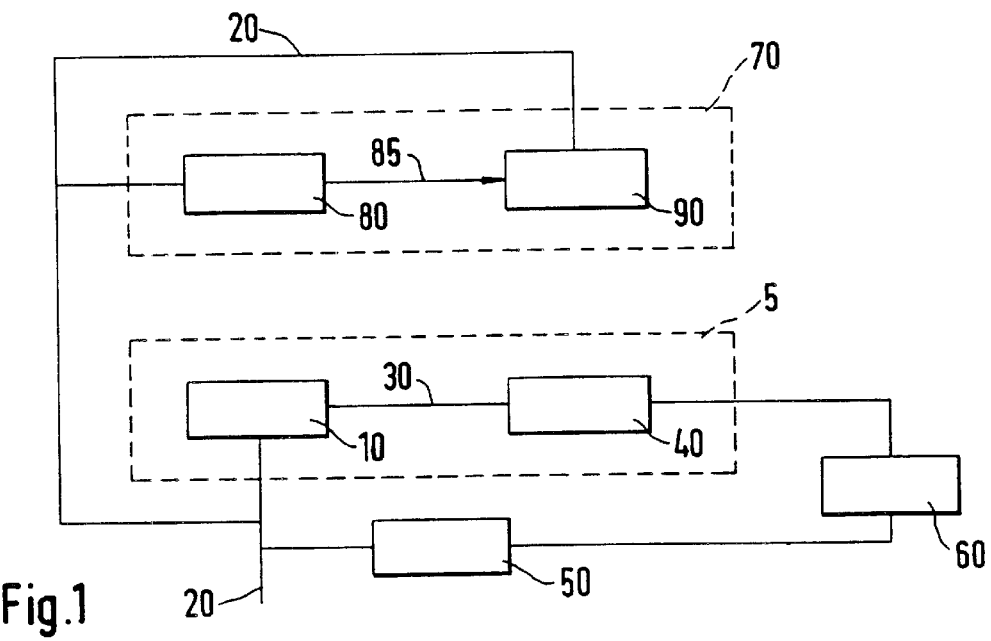
FIG. 1 depicts an event counter 5 for real time counting as a device for event recognition as known in the art.

The event recognition unit 400 allows measuring a plurality of individual events as explained with respect to FIG. 1. Further more, sequential dependencies of information on the information bus can be analyzed, such as timing information or correlations between events. In terms of the more illustrative example as given above, one function of the event recognition unit 400 could be to determine 'the number of cars following a red car'. Alternatively, in a more complicated example, to determine 'the number of cars with two or more children as passengers following the same red car'.

While in the above example "determine the number of cars following a red car" the sequential scheme of the pattern term has to be predefined before the actual monitoring, the invention further allows to flexibly and dynamically adapt the pattern terms scheme during the process of monitoring. Thus, a dynamic scheme of pattern terms could be, for example, "determine the number of cars following a car with a color to be defined" or "determine when A cars follow a car with a color to be defined and with B persons in the car, whereby A, B, and the color will be determined in accordance with actual events occurring in the test system".

In an example of a PCI bus environment, an actual monitoring scheme in accordance with the invention could be, for example, "recognized all accesses to a device in a specific slot of the system". On a PCI bus used in PC computer systems, configuration data is generally written to peripheral devices at boot time. This includes the so-called "base addresses" specifying the addresses that the devices request. These base addresses are written to special registers on the devices. The task will therefore be broken down into two parts:

1. Recognize all configuration events to the device that register addresses;
2. After that, recognize all events addressed to registered addresses.

It is clear that devices on the bus can have more than one address, but for the sake of simplicity of the example, only one address will be used here.

Figure 5:
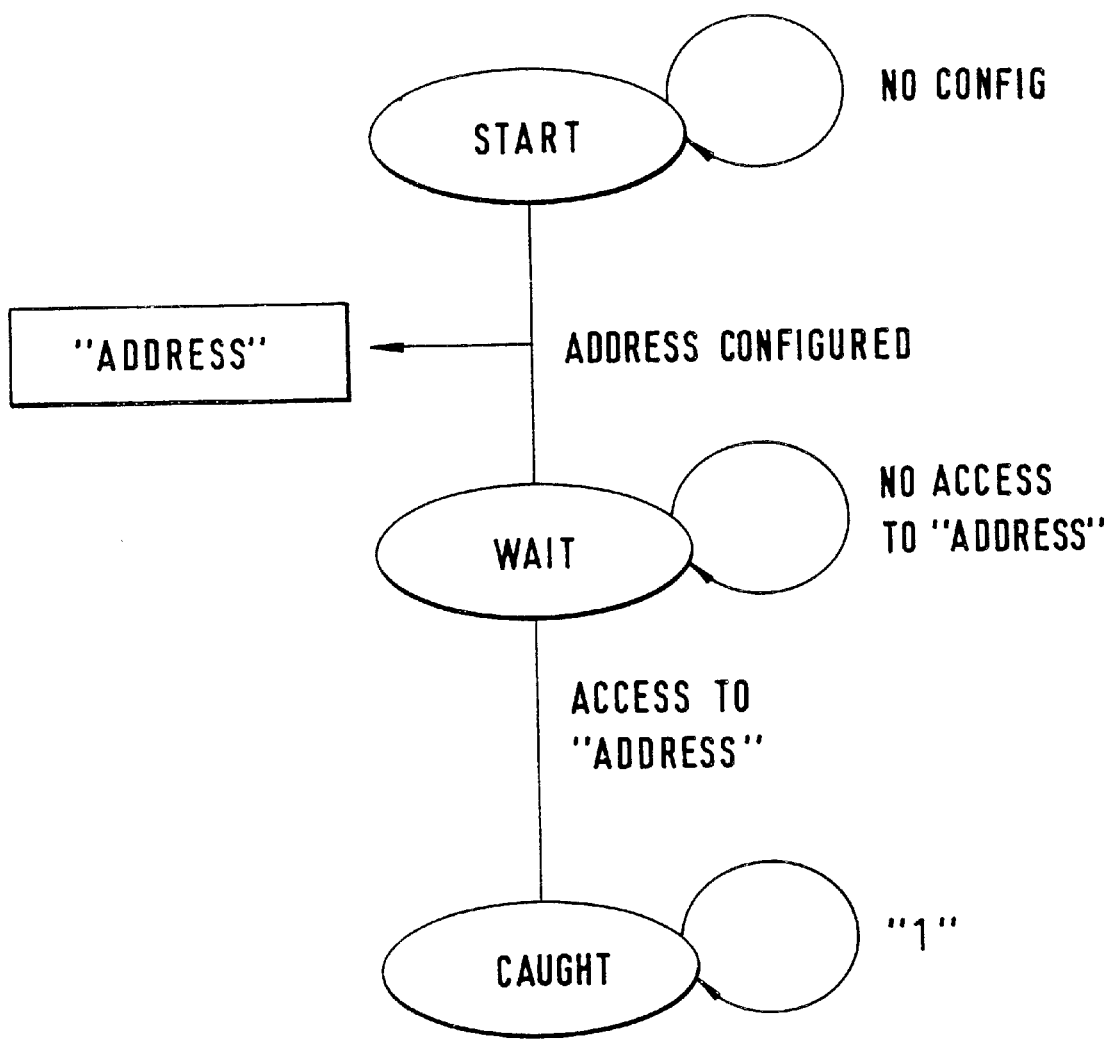
FIG. 5 shows a state diagram of an example.

FIG. 5 shows a state diagram of the above example. A state "start" is left, whenever an event "address configured" is recognized. On transition to a state "wait", the value of the registered address is saved in a dynamic pattern term. From then on, the dynamic pattern term is valid and catches all events addressed to the device. A state "caught" is entered when an access to the saved address is encountered.

An example wherein the dynamic pattern term's variable part is also changed dynamically is the recognition of the size of a device's address space. In the PCI bus environment this is specified by the number of read-only bits of the device's address register, determining which parts of an address are relevant to identify a device.

The event recognition unit 400 further allows implementing customized rules for monitoring defined event sequences of event behaviors and drawing conclusions therefrom e.g. by signaling an unwanted event behavior. An example of a customized rule could be to 'indicate when there are more than x clock signals CLOCKS between data transfers', whereby the value for x will be dependent on an event occurring during the run time of the customized rule.

In a preferred embodiment, the event recognition unit 400 is used in a synchronous mode. The sequencer state machine 140 receives as inputs a clock signal and signals from the comparators 110, and may further receive one or more feed-back signals from one or more of the outputs 160. The state loop 180 is implemented as a state loop bus feeding back one or more outputs to one or more state inputs of the sequencer state machine 140. On each dock cycle, the sequencer state machine 140 checks its inputs for information provided thereon and will perform a specific task dependent on the provided information. Such a task can be e.g. a counter impulse on one or several of the outputs 160, or a change in state of the sequencer state machine 140.

In an example for the functionality of the event recognition unit 400, the state of the sequencer state machine 140 is e.g. at a binary value '000b'. The logic of the sequencer state machine 140 is set to "increment a specific counter at one of the outputs 160 (cf. FIG. 3), if a pattern xyz on a specific one of the comparators 130 matches, and afterwards perform a jump to a state 2", then the resulting actions would be as following:

(1) Check whether the comparator 130 matches the pattern xyz.
(2) If yes, then "increment" the counter 160 and switch the sequencer state machine 140 to a state 010b.

The sequencer state machine 140 preferably performs the specific tasks by means of a memory-based look up table (matrix or array). The size of the memory (matrix) is then determined by the number of inputs i (i.e. the input lines 130, possible feed-back signals, and the state bus 180) and the number of outputs o (i.e. the busses 160 and possible state outputs for the state bus 180). The matrix would be an $2^i$ times o array, or in other words, a storage element with $2^i \times o$ entries, whereby i inputs are fed to a memory's address bus and o outputs are connected to a memory's data bus.

What is claimed is:

1. An event recognition unit (400) for recognizing and/or monitoring events on an information bus (120), the event recognition unit (400) comprising:

a sequencer state machine (140) for determining sequential dependencies of events, and a comparator (110) coupled to the information bus (120) and to the sequencer state machine (140), the comparator (110) being adapted to provide a signal to the sequencer state machine (140) when a pattern on the information bus (120) matches with a pattern term of the comparator (110), characterized by:

an output loop (410, 420) from the sequencer state machine (140) to the comparator (110) for dynamically setting the pattern term of the comparator (110).

2. The event recognition unit (400) of claim 1, wherein the dynamically setting of the pattern terms of the comparator (110) is provided by directly setting new values of the pattern terms, and/or by causing the comparator (110) to receive a new pattern term preferably from the information bus (120).

3. The event recognition unit (400) of claim 1, wherein the pattern terms has an indication indicating whether the pattern has been programmed yet.

4. The event recognition unit (400) according to claim 1, wherein the output loop (410, 420) comprises a register (420) coupled between the sequencer state machine (140) and the comparator (110).

5. The event recognition unit (400) of claim 4, wherein the register (420) is coupled to the information bus (120).

6. The event recognition unit (400) according to claim 1, further comprising:

a plurality of comparators (110) coupled to the information bus (120) and being adapted for receiving signals from the information bus (120), whereby:

the plurality of comparators (110) provide input busses (130) to the sequencer state machine (140) which provides a plurality of output busses (160) and a state loop (180), the output loop (410, 420) comprises a plurality of registers (420) coupled between an output of the sequencer state machine (140) and the plurality of comparators (110).

7. The event recognition unit (400) according to claim 6, wherein each register (420) is coupled to the information bus (120).

8. The event recognition unit (400) according to claim 1, wherein a state of the sequencer state machine depends on the history of information as provided thereto.

9. The event recognition unit (400) according to claim 1, further comprising one or more counters coupled to the event recognition unit (400) and/or one or more memories coupled to the event recognition unit (400), and/or a memory coupled to a register that is coupled back to the memory.

* * * * *